United States Patent
Khanagha

(10) Patent No.: US 10,854,220 B2
(45) Date of Patent: *Dec. 1, 2020

(54) PITCH DETECTION ALGORITHM BASED ON PWVT OF TEAGER ENERGY OPERATOR

(71) Applicant: OmniSpeech LLC, College Park, MD (US)

(72) Inventor: Vahid Khanagha, College Park, MD (US)

(73) Assignee: OmniSpeech LLC, College Park, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 16/272,034

(22) Filed: Feb. 11, 2019

(65) Prior Publication Data

US 2019/0172481 A1 Jun. 6, 2019

Related U.S. Application Data

(63) Continuation of application No. 15/476,013, filed on Mar. 31, 2017, now Pat. No. 10,249,325.

(60) Provisional application No. 62/316,432, filed on Mar. 31, 2016.

(51) Int. Cl.
| | |
|---|---|
| *G10L 25/90* | (2013.01) |
| *G10L 25/18* | (2013.01) |
| *G10L 15/18* | (2013.01) |
| *G10L 25/06* | (2013.01) |
| *G10L 15/22* | (2006.01) |

(52) U.S. Cl.
CPC .......... *G10L 25/90* (2013.01); *G10L 15/1815* (2013.01); *G10L 25/06* (2013.01); *G10L 25/18* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 5,969,282 A | 10/1999 | Berners et al. | |
| 6,004,017 A | 12/1999 | Madhavan | |
| 7,493,254 B2 | 2/2009 | Jung et al. | |
| 8,793,128 B2 | 7/2014 | Miki | |
| 9,153,245 B2 | 10/2015 | Qi et al. | |
| 10,204,643 B2 * | 2/2019 | Khanagha | G10L 25/18 |
| 10,249,325 B2 * | 4/2019 | Khanagha | G10L 25/18 |
| 10,403,307 B2 * | 9/2019 | Khanagha | G10L 25/18 |
| 10,510,363 B2 * | 12/2019 | Khanagha | G10L 25/18 |
| 2005/0149321 A1 | 7/2005 | Kabi et al. | |

(Continued)

OTHER PUBLICATIONS

Rainer Martin, "Spectral Subtraction Based on Minimum Statistics", Institute for Communication Systems and Data Processing (IND), Aachen University of Technology, Published: Nov. 3, 2009, 4 pgs.

*Primary Examiner* — Abul K Azad
(74) *Attorney, Agent, or Firm* — Maier & Maier, PLLC

(57) ABSTRACT

A pitch detection method. Such a pitch detection method may use a Teager Energy Operator (TEO) with a Pseudo Weigner Ville Transformation (PWVT) to recover speech from noise and to recover low-frequency information of the speech signal in its detection of a pitch value. Also, the pitch detection method may use the combinatory PWVT and the respective state machine for decision making.

16 Claims, 1 Drawing Sheet

(56) References Cited

U.S. PATENT DOCUMENTS

| | | |
|---|---|---|
| 2007/0050439 A1 | 3/2007 | Elfataoui et al. |
| 2011/0099007 A1 | 4/2011 | Zhang |
| 2013/0335267 A1 | 12/2013 | Heo et al. |
| 2016/0259849 A1 | 9/2016 | Sinha et al. |
| 2019/0206426 A1* | 7/2019 | Khanagha ............... G10L 25/18 |

* cited by examiner

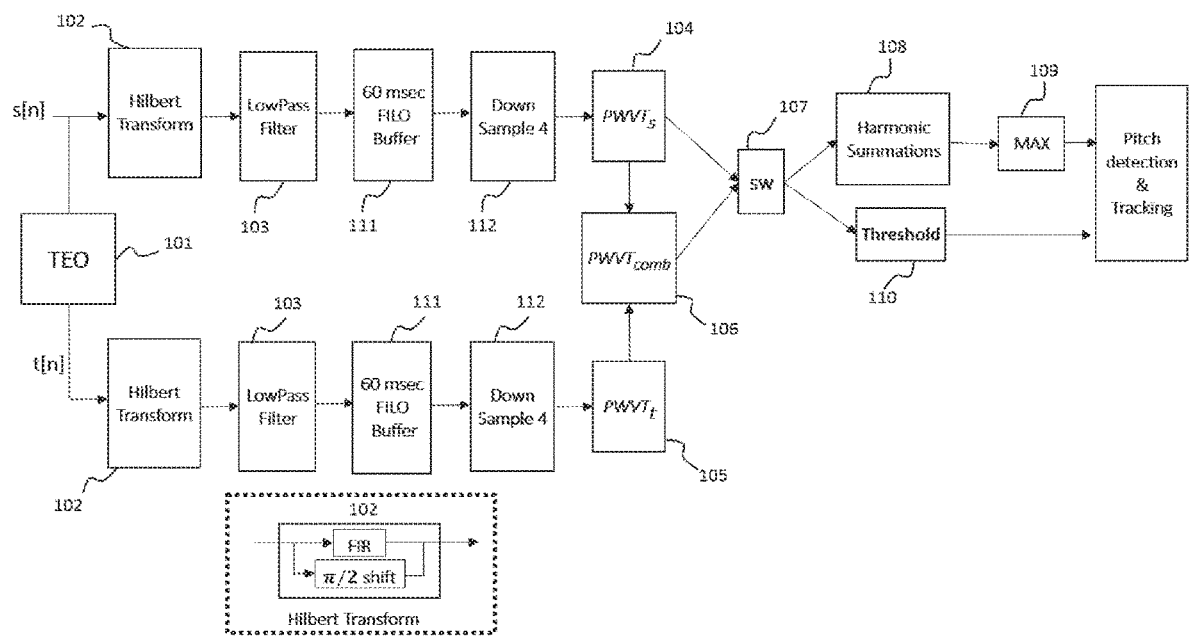

PITCH DETECTION ALGORITHM BASED ON PWVT OF TEAGER ENERGY OPERATOR

CROSS REFERENCE TO RELATED APPLICATIONS

This application is a continuation of U.S. patent application Ser. No. 15/476,013, filed Mar. 31, 2017, which claims priority from U.S. Provisional Patent Application Ser. No. 62/316,432, filed Mar. 31, 2016, the entire contents of which are hereby incorporated by reference.

BACKGROUND

There are two general categories of pitch detection algorithms. Time domain algorithms that rely on the periodic shape of speech waveform over time and use different measures of periodicity such as the autocorrelation function or Average Magnitude Difference Function (AMDF) to evaluate the periodicity of the waveform. These methods are often computationally expensive and are also prone to insertion errors when dealing with correlated type of noise, as they cannot discriminate between tonal periodicity of a correlated noise and the rich harmonically structured periodicity of speech.

Frequency domain methods, however, are based on direct evaluation of the existence of speech harmonic frequency structure, using one of the many available spectral representation techniques such as short term Fourier transform, wavelet transform, Cepstrum, and others. The success of the frequency domain methods depend on their ability to resolve frequency components of the speech, especially in the presence of noise. The latter usually requires a relatively large analysis window (as large as 100 msec), which is not suitable for real-time applications that require the lowest possible processing delay. Moreover, a large analysis window compromises the time resolution of the pitch estimates.

One of the technical problems in detection of human pitch from noisy speech recordings is coping with correlated types of noises, such as car engine noise, that contain strong and stable low-frequency activity. In such a case, the noise waveform has a periodic shape and thus it is difficult to distinguish them from periodic voiced segments of the speech signal. Also, another technical problem appears for speech recordings that have lost their low-frequency information for various reasons, such as imperfect recording conditions, telephony microphone filtering (a high-pass filtering effect with cut-off frequency around few hundreds of Hz), and the like.

SUMMARY

According to at least one exemplary embodiment, a pitch detection method may be provided. Such a method may provide a solution for highly correlated types of noises by reducing the insertion errors significantly. Also, such a method may handle speech recordings whose low-frequency information is filtered out.

Such a pitch detection method may include: sampling a signal to generate a first discrete time signal; applying Teager Energy Operator (TEO) to the first discrete time signal to generate a second discrete time signal; generating a first complex valued signal from the first discrete time signal; generating a second complex valued signal from the second discrete time signal; computing Pseudo Weigner Ville Transformation (PWVT) on the first complex valued signal to generate a first spectral representation of the signal; computing PWVT on the second complex valued signal to generate a second spectral representation of the signal; generating a combined spectral representation from the first spectral representation and the second spectral representation; computing, to generate a pitch candidate, a harmonic summation on at least one of the combined spectral representation and the first spectral representation; and deciding the pitch candidate as a pitch value if the harmonic summation value of the pitch candidate is larger than a threshold.

In another embodiment, the pitch detection method may further include: applying Hilbert Transform to the first discrete time signal to generate the first complex valued signal; and applying Hilbert Transform to the second discrete time signal to generate the second complex valued signal, where each of the two complex values are then low-pass filtered, down-sampled and buffered to generate an analysis window.

In still another embodiment, when applying TEO, TEO can act as a non-linear filter which outputs a constant value from a tonal periodic waveform and recovers the low-frequency content of a high-pass filtered impulsive waveform, and when computing PWVT, PWVT is computed by 512 points Discrete Fast Fourier Transform (DFFT) of the down-sampled Hilbert transform of the signal to form a frequency domain representation of the signal over time in the frequency range of 0 to 1 KHz. Also, when generating the combined spectral representation, the low-frequency part of the combined spectral representation is taken from the second spectral representation and the remaining part of the combined spectral representation is taken from the first spectral representation.

In yet another embodiment, the harmonic summation can be computed on the combined spectral representation if an amount of the low-frequency energy of the signal is larger than a pre-determined threshold that represents a low-frequency corruption of the signal, and the harmonic summation is computed within a human pitch frequency range. Also, when deciding the pitch candidate as the pitch value, the pitch candidate is taken as the location of the peak of the harmonic summation, and the threshold is fifty times of a median value of at least one of the combined spectral representation and the first spectral representation.

In another embodiment, when deciding the pitch candidate as the pitch value, the maximum value of the harmonic summation is compared against two thresholds, and a pitch detection decision is made if it is higher than at least one of these two thresholds, where the thresholds are the median value of the PWVT and the average value of the maximum of the harmonic summation over more than one hundred frames in which the no pitch was detected.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which:

FIG. 1 is an exemplary block diagram of a pitch detection algorithm according to an exemplary embodiment.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to an exemplary embodiment, and referring to the FIGURE generally, a pitch detection method may be provided. According to one exemplary embodiment, the pitch detection method may provide a solution for highly correlated types of noises by reducing the insertion errors significantly. Also, such a method may handle speech recordings whose low-frequency information is filtered out. Accordingly, it can provide acceptable pitch estimates on adverse set of speech-noise combinations.

As described above, correlated types of noises and the loss of lost low-frequency information are two important challenges in detection of human pitch from noisy speech recordings. To resolve such problems, it is noted that the majority of voiced speech segments exhibit an impulsive type of periodicity (the waveform looks like an exponentially weighted sinusoid) rather than a tonal type of periodicity (the waveform looks like a sinusoid). This impulsive type of periodicity results in vertical striations in a wideband spectrogram. The correlated types of noises, however, show a tonal type of periodicity and they sometimes are very similar to a pure sinusoid. Accordingly, this difference in the type of periodicity can be used to distinguish correlated type of noise from voiced speech. The same concept can help to recover the weakened low-frequency content of high-passed filtered speech. Indeed, for high-pass filtered voiced speech, the periodic impulse train still exists, but it has little or no energy at frequencies below a few hundred Hz. However, as the impulses still show stable frequency activity across all remaining frequencies bands; thus, once detected, they can be used to recover the weakened low-frequency information.

Turning now to exemplary FIG. 1, FIG. 1 shows an exemplary block diagram of a pitch detection algorithm. According to an exemplary embodiment, to benefit from the above-mentioned spectral properties, the Teager Energy Operator (TEO) 101 is applied. TEO 101 acts as a non-linear filter: if applied to a tonal periodic waveform such as correlated noise, it returns a constant value and when applied to a high-pass filtered impulsive waveform, it recovers the low-frequency content. The TEO 101 applied to the discrete-time signal (s[n]) is defined as:

$$t[n]=s^2[n]-s[n-1]s[n+1] \qquad \text{Equation 1}$$

Once the TEO is applied to the speech signal, the low-frequency spectral shape will be enhanced as explained above. But the higher frequencies sometimes show distorted behavior. To solve this problem, a combinatory approach may be employed in an exemplary embodiment as follows.

Referring still to FIG. 1, the discrete time speech signal (s[n]) may be sampled at 8 kHz and fed to the pitch detection algorithm as 10 msec frames (80 samples at 8 KHz) and the TEO 101 is computed to obtain t[n]. As Pseudo Weigner Ville Transformation (PWVT) operates on complex input signals, for both t[n] and s[n], at first, a Hilbert Transform 102 is applied to the signal. The Hilbert transform 102 is implemented in the time-domain using a half band Finite-Impulse-Response (FIR) filter. The output of the FIR filter forms the real part, and the shifted version of speech signal (equal to $\pi 2$) forms the imaginary part. Consequently, the resulting complex values are low-pass filtered by an anti-aliasing low-pass filter 103 with a cut-off frequency of 1 kHz, and then buffered to form an analysis window of 60 msec length (e.g. reference number 111 of FIG. 1). Consequently, after down-sampling the analysis window by a factor of 4 (e.g. reference number 112 of FIG. 1), the PWVT 104 is computed.

According to an exemplary embodiment, the PWVT may be computed by taking the Discrete Fast Fourier Transform (DFFT) of the following discrete time correlation summation:

$$w_s[m] = \sum_{k=-256}^{256} g[k]s[k+m]s*[k-m], m = -255:254 \qquad \text{Equation 2}$$

$$w_t[m] = \sum_{k=-256}^{256} g[k]t[k+m]t*[k-m], m = -255:254 \qquad \text{Equation 3}$$

where g is a Gaussian smoothing window, m denotes time index and k denotes frequency index. $w_s[m]$ and $w_t[m]$ are then multiplied by another Gaussian window before computation of the 512 point DFFT to obtain the PWVT transform for both branches: $PWVT_s$ 104 is obtained from the signal itself and $PWVT_t$ 105 is obtained from the TEO 101. Both $PWVT_s$ 104 and $PWVT_t$ 105 provide a 512 point representation of the first 1 KHz frequency content of the signal over time. As $PWVT_t$ 105 provides an enhanced representation for lower frequencies and $PWVT_s$ 104 provides a clearer representation for the higher frequencies (above 250 Hz), according to an exemplary embodiment, the first 125 points are taken from $PWVT_t$ 105 and the remaining points are taken from $PWVT_s$ 104 to form a combined representation $PWVT_{comb}$ 106.

Although $PWVT_{comb}$ 106 provides an overall enhanced representation for noisy speech, using only the representation computed from the raw speech signal ($PWVT_s$ 104) may still be done when the signal is clean, or when there is no low-frequency corruption. This provides computational efficiency (when $PWVT_t$ is not computed at all) as well as precision for rare cases where the TEO 101 filters out some of the voiced frames. For this reason, in an exemplary embodiment, a state machine (SW 107 in FIG. 1) may be implemented to decide which PWVT is to be used between $PWVT_{comb}$ 106 or $PWVT_s$ 104. According to an exemplary embodiment, the algorithm starts in the state that it uses $PWVT_{comb}$ 106. Then for every ten frames, the relative amount of the low-frequency energy may be computed as:

$$R_e = \frac{\sum_{k=30}^{110} PWVT_s}{\sum_{k=30}^{110} PWVT_{comb}} \qquad \text{Equation 4}$$

According to an exemplary embodiment, if it happens for more than ten times that $R_e \approx 1$, the state is switched to the mode that the $PWVT_s$ 104 is only used. Afterwards, if it happens for more than ten frames that $R_e<0.2$, the state is switched back to the mode that $PWVT_{comb}$ 106 is used.

Once it is decided which PWVT to be used, by using the absolute value of this representation, the existence of harmonics can be checked, as they appear during the voiced parts of the speech signal. For doing so, the harmonic summations 108 of the PWVT[m, k] may be computed as:

$$HS[m, k] = \sum_{q=1}^{N_q} PWVT[m, qk] - \sum_{q=1}^{N_q} PWVT[m, (q+0.5)k] \qquad \text{Equation 5}$$

According to an exemplary embodiment, HS[m, k] is computed only in the frequency range that corresponds to the range of human pitch frequency (60 Hz to 400 Hz). If a given analysis window contains voiced speech with a pitch frequency corresponding to frequency bin $k_0$, PWVT[m,k] will show prominent peaks at integer multiplies of $k_0$ with valleys located between adjacent peaks. Consequently, HS[m, k] is expected to generate prominent maxima at the bin $k_0$. Thus, the location of the maximum of HS[m, k] ($k_{max}$) may be taken as a candidate pitch (e.g. the reference number 109 of FIG. 1). If a processed frame belongs to a voiced segment of the speech signal, HS[m, $k_{max}$] should attain a very high value. Accordingly, in an exemplary embodiment, a threshold must be applied to decide whether the computed value is high enough so that the current frame can be considered as a voiced frame. According to an exemplary embodiment, to reduce the sensitivity of the algorithm to input signal power variations, a soft threshold may be used to make the final determination (instead of a fixed hard threshold that is vulnerable to input level variations). To do so, the median value of PWVT[m, k] is taken as the noise floor level ($N_f$) (e.g. reference number 110 of FIG. 1) and then, if HS[m, $k_{max}$] is larger than 50 times the noise floor, the frame being processed is considered a voiced frame and $K_{max}$ is taken the frequency index of the corresponding pitch frequency. Such decision logic may successfully detect voiced speech signal with high pitch frequencies for which the harmonic distance is relatively high and thus the median value of the PWVT[m, $k_{max}$] provides a good estimate of the noise floor.

However, for voiced speech with lower pitch value, the harmonic lines can be so close that they somehow overlap and the median value is too large to be considered as a threshold. According to another exemplary embodiment, to avoid such a technical problem, a second criterion may be applied to make the voicing decision based on a second threshold, which is the moving average of PWVT[m, $k_{max}$] over the non-speech frames. According to another exemplary embodiment, this second decision criteria is based on a feedback from the first criteria and updates the moving average value only at the frames that are not considered as voiced frames. More specifically, at the initialization time, only the first criteria is applied and for the frames that are not taken as voiced, the moving average is being updated ($MA_{PWVT_{noise}}$). According to another exemplary embodiment, after one hundred updates, the second criterion may be started to be considered as a threshold and the frame may be taken as voiced if either of the two criteria are met, (for example, PWVT[m, $k_{max}$]>50$N_f$ or PWVT[m, $k_{max}$]>2$MA_{PWVT_{noise}}$) As the analysis window is 60 msec long, the computed pitch value belongs to the central frame and, as such, the algorithm has 30 msec of inherent latency (delay in computation of the pitch value for each new frame).

The foregoing description and accompanying FIGURES illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method for a pitch detection comprising:
   applying, by a processor communicatively coupled to one or more memory devices, a Teager Energy Operator (TEO) to a first signal to generate a second signal;
   computing, by the processor, a Pseudo Weigner Ville Transformation (PWVT) to generate a third signal from the first signal;
   computing, by the processor, the PWVT to generate a fourth signal from the second signal;
   generating, by the processor, a combined signal from the third signal and the fourth signal;
   computing, by the processor, to generate a pitch candidate, a harmonic summation on at least one of the combined signal and the third signal; and
   deciding, by the processor, the pitch candidate as a pitch value, the pitch candidate is larger than a threshold.

2. The method of claim 1, further comprising:
   sampling, by the processor, a signal to generate the first signal so that the first signal is a first discrete time signal and the second signal is a second discrete time signal;
   generating, by the processor, a first complex valued signal from the first discrete time signal; and
   generating, by the processor, a second complex valued signal from the second discrete time signal,
   wherein when sampling the signal, the signal is each frame of a speech signal.

3. The method of claim 2, further comprising:
   applying, by the processor, a Hilbert Transform to the first discrete time signal to generate the first complex valued signal; and
   applying, by the processor, a Hilbert Transform to the second discrete time signal to generate the second complex valued signal,
   wherein each of the first complex valued signal and the second complex valued signal is low-pass filtered, buffered and down-sampled,
   wherein the processor computes the PWVT on each of the first complex valued signal and the second complex valued signal to generate a spectral representation so that the third signal and the fourth signal are a first spectral representation and a second spectral representation, and
   wherein the combined signal is a combined spectral representation generated from the first spectral representation and the second spectral representation.

4. The method of claim 3, wherein when generating the combined spectral representation, a low-frequency part of the combined spectral representation is taken from the second spectral representation and a remaining part of the combined spectral representation is taken from the first spectral representation,
  wherein the harmonic summation is computed on the combined spectral representation if a relative amount of a low-frequency energy of the signal is larger than a pre-determined threshold, and
  wherein the harmonic summation is computed within a human pitch frequency range.

5. The method of claim 3, wherein when deciding the pitch candidate as the pitch value,
  the pitch candidate is a corresponding frequency location of a maximum value of the harmonic summation, and
  the threshold is fifty times of a median value of at least one of the combined spectral representation and the first spectral representation.

6. The method of claim 3, wherein when applying the Hilbert Transform, a half band Finite-Impulse-Response (FIR) filter is applied for a real part, and shift in an amount of $\pi/2$ is applied for an imaginary part,
  wherein an anti-aliasing low-pass filter with cut-off frequency of 1 KHz is applied to low-pass filter each of the first complex valued signal and the second complex valued signal,
  wherein each of the first complex valued signal and the second complex valued signal is buffered to form the analysis window with 60 msec length, and
  wherein each of the first complex valued signal and the second complex valued signal is down sampled by a factor 4.

7. The method of claim 2, wherein the threshold is at least one of the fifty times of the median value of the PWVT of a current frame and an average value of more than one hundred frames of the speech signal in which the pitch value is not detected.

8. The method of claim 1, wherein the TEO acts as a non-linear filter which outputs a constant value from a tonal periodic waveform and recovers a low-frequency content of a high-pass filtered impulsive waveform, and
  wherein the PWVT is computed by at least one of Fourier Transform as a frequency domain representation of the signal and 512 points Discrete Fast Fourier Transform (DFFT) of a down-sampled Hilbert transform of the signal to form a frequency domain representation of the signal over time in the frequency range of 0 to 1 Khz.

9. A system for a pitch detection comprising:
  one or more memory devices; and
  at least one processor communicatively coupled to the one or more memory devices, the processor operable to:
  apply a Teager Energy Operator (TEO) to a first signal to generate a second signal;
  compute a Pseudo Weigner Ville Transformation (PWVT) to generate a third signal from the first signal;
  compute the PWVT to generate a fourth signal from the second signal;
  generate a combined signal from the third signal and the fourth signal;
  compute a harmonic summation on at least one of the combined signal and the third signal to generate a pitch candidate; and
  decide the pitch candidate as a pitch value, the pitch candidate is larger than a threshold.

10. The system of claim 9, the processor further operable to:
  perform a sampling a signal to generate the first signal so that the first signal is a first discrete time signal and the second signal is a second discrete time signal;
  generate a first complex valued signal from the first discrete time signal; and
  generate a second complex valued signal from the second discrete time signal,
  wherein in the sampling the signal, the signal is each frame of a speech signal.

11. The system of claim 10, the processor further operable to:
  apply a Hilbert Transform to the first discrete time signal to generate the first complex valued signal; and
  apply a Hilbert Transform to the second discrete time signal to generate the second complex valued signal,
  wherein each of the first complex valued signal and the second complex valued signal is low-pass filtered, buffered and down-sampled,
  wherein the processor computes the PWVT on each of the first complex valued signal and the second complex valued signal to generate a spectral representation so that the third signal and the fourth signal are a first spectral representation and a second spectral representation, and
  wherein the combined signal is a combined spectral representation generated from the first spectral representation and the second spectral representation.

12. The system of claim 11, wherein when generating the combined spectral representation, a low-frequency part of the combined spectral representation is taken from the second spectral representation and a remaining part of the combined spectral representation is taken from the first spectral representation,
  wherein the harmonic summation is computed on the combined spectral representation if a relative amount of a low-frequency energy of the signal is larger than a pre-determined threshold, and
  wherein the harmonic summation is computed within a human pitch frequency range.

13. The system of claim 11, wherein when deciding the pitch candidate as the pitch value,
  the pitch candidate is a corresponding frequency location of a maximum value of the harmonic summation, and
  the threshold is fifty times of a median value of at least one of the combined spectral representation and the first spectral representation.

14. The system of claim 11, wherein when applying the Hilbert Transform, a half band Finite-Impulse-Response (FIR) filter is applied for a real part, and shift in an amount of $\pi/2$ is applied for an imaginary part,
  wherein an anti-aliasing low-pass filter with cut-off frequency of 1 KHz is applied to low-pass filter each of the first complex valued signal and the second complex valued signal,
  wherein each of the first complex valued signal and the second complex valued signal is buffered to form the analysis window with 60 msec length, and
  wherein each of the first complex valued signal and the second complex valued signal is down sampled by a factor 4.

15. The system of claim 10, wherein the threshold is at least one of the fifty times of the median value of the PWVT of a current frame and an average value of more than one hundred frames of the speech signal in which the pitch value is not detected.

16. The system of claim 9, wherein the TEO acts as a non-linear filter which outputs a constant value from a tonal periodic waveform and recovers a low-frequency content of a high-pass filtered impulsive waveform, and
wherein the PWVT is computed by at least one of Fourier Transform as a frequency domain representation of the signal and 512 points Discrete Fast Fourier Transform (DFFT) of a down-sampled Hilbert transform of the signal to form a frequency domain representation of the signal over time in the frequency range of 0 to 1 Khz.

\* \* \* \* \*